(12) United States Patent
Ogino et al.

(10) Patent No.: US 6,171,710 B1
(45) Date of Patent: Jan. 9, 2001

(54) SURFACE TREATING AGENT FOR PLATING AND BASE MATERIAL WITH THE PLATING ADHERED THERETO

(75) Inventors: Masayuki Ogino, Akashi; Shigehiko Hayashi, Kobe; Masahito Kawahara, Osaka; Kazuo Goto, Higashiosaka; Toru Noguchi; Yoshio Yamaguchi, both of Kobe, all of (JP)

(73) Assignee: Mitsuboshi Belting Ltd., Kobe (JP)

( * ) Notice: Under 35 U.S.C. 154(b), the term of this patent shall be extended for 0 days.

(21) Appl. No.: 08/638,170

(22) Filed: Apr. 26, 1996

(30) Foreign Application Priority Data

Apr. 28, 1995 (JP) .................................................. 7-129697
Feb. 6, 1996 (JP) .................................................... 8-045491

(51) Int. Cl.$^7$ ...................................................... B22F 7/04
(52) U.S. Cl. ............................ 428/559; 428/548; 428/551
(58) Field of Search .................................. 428/546, 548, 428/551, 559, 472, 672, 680, 670, 673; 252/309, 514, 513, 500; 106/480, 286.7

(56) References Cited

U.S. PATENT DOCUMENTS

| | | | |
|---|---|---|---|
| 3,790,400 | * 2/1974 | Kuzmik | 117/47 A |
| 3,871,944 | * 3/1975 | Dominguez-Burguette | 161/42 |
| 4,248,921 | * 2/1981 | Steigerwald et al. | 428/148 |
| 4,301,040 | * 11/1981 | Berbeco | 252/511 |
| 4,774,129 | * 9/1988 | Komiyama | 428/213 |
| 4,943,482 | * 7/1990 | Charmot et al. | 428/407 |
| 5,234,758 | * 8/1993 | Olsen et al. | 428/323 |
| 5,358,669 | * 10/1994 | Demiryont et al. | 252/587 |
| 5,405,906 | * 4/1995 | Olsen et al. | 524/439 |
| 5,458,955 | * 10/1995 | Vaugn et al. | 428/212 |
| 5,470,643 | * 11/1995 | Dorfman | 428/206 |
| 5,587,111 | * 12/1996 | Watanabe et al. | 252/514 |
| 5,679,466 | * 10/1997 | Noguchi et al. | 428/551 |
| 5,731,075 | * 3/1998 | Goto et al. | 428/323 |

FOREIGN PATENT DOCUMENTS

699637 * 3/1996 (EP) .

OTHER PUBLICATIONS

Noguchi, J. Mat. Sci. Letters, 10 (1991) 477, no month, "Novel Method to Disperse Ultrafine Metal Particles into Polymer."*

Itakura et al., "Prep. and Char. of Ultrafine Metal . . . ", Langmuir 11 (Oct. 1995), p. 4129.*

Tamai et al., "Prep. and Char. of Ultrafine Metal . . .", J. Appl. Polym. Sci. 56 (Apr. 1995), p. 441.*

Ohtaki et al., "Room Temp. Prep. and Optical . . . ", Chem Lett. Nov. 1992, p. 2201.*

* cited by examiner

*Primary Examiner*—Deborah Jones
(74) *Attorney, Agent, or Firm*—Wood, Phillips, VanSanten, Clark & Mortimer

(57) ABSTRACT

A layer is provided for bonding a conductive plating to a substrate which substrate normally does not provide firm bonding of plating directly thereto. The bonding layer forms a matrix in which are dispersed ultrafine metal particles. The bonding layer is formed in situ on the substrate surface with the metal particles being maintained unaggregated in the matrix as it is formed on the surface. Plating subsequently formed on the outer surface of the bonding layer is effectively firmly bonded to the substrate through the intermediary of the matrix and metal particles distributed therein. The bonding layer includes a fixative formed of an organic compound including a metal and an organic solvent. The bonding layer may further include a film strengthener.

8 Claims, 1 Drawing Sheet

SURFACE TREATING AGENT FOR PLATING AND BASE MATERIAL WITH THE PLATING ADHERED THERETO

BACKGROUND OF THE INVENTION

1. Field of the Invention

This invention relates to plating of conductive materials on substrates which normally afford a relatively poor adhesion with such plating materials.

2. Background Art

A number of techniques have been developed for plating metals on different surfaces that normally provide poor bonding with the plating when conducted electrolytically. Illustratively, the plating may be carried out in a liquid phase, or the plating may be carried out by vapor deposition in a gas phase. Alternatively, the plating may be effected by sputtering.

Non-electrolytic plating is well known as a method for metallizing a surface of an electrically insulating material. For example, when the material to be plated is a ceramic such as an aluminum oxide sintered body, an aluminum nitride sintered body, or a silicon carbide sintered body, metallic palladium fine particles have been adhered to the surface thereof. A plating film is then formed thereon. The metallic palladium particles are formed on the surface by bringing an aqueous solution including palladium ions into contact with the ceramic surface and reducing it in situ.

A serious problem arises however because the palladium particles are not strongly adhered to the surface of the material to be plated and the plating therefore has poor adhesion to the substrate surface.

Where the ceramic is a sintered body, irregularities on the material surface cause adherence to be slightly improved as a result of the anchoring effect. However, when the material surface is smooth, such as with glass, the plating very often peels from the surface.

Also, when plating on organic polymers, the material surface may be as smooth as glass and adherence again has been found to be bad.

SUMMARY OF THE INVENTION

This invention has as one objective to solve the above problem. It is an object of the invention to provide a surface treating agent, which when used in plating a metal layer to a base material to which it has heretofore been difficult to plate, such as a ceramic, glass, polymer or metal, makes possible strong adherence of the plating to the base material.

This invention comprehends providing a surface agent firmly bonded to the base material surface and in turn assuring the film bonding of the plating to the base material. The agent includes at least one kind of metal ultrafine particle chosen from Au, Pt, Pd, Rh, Ag, and Ni, a fixative including an organic compound including a metal which fixes the metal ultrafine particles, and an organic solvent. The fixative is preferably present in the ratio of 0.1 to 10 mol to 1 mol of the metal of the ultrafine particles. The agent may include a film strengthener and an organic solvent. With respect to 1 mol of the metal particles, the film strengthener is preferably present in the ratio of 0.01 to 5 mol.

The agent may include a viscosity adjusting material such as a polymer material soluble in an organic solvent with noble metal ultrafine particles being dispersed in the polymer.

The invention comprehends providing a complex made by preparing a thermodynamically inequilibrized polymer layer and bringing at least one kind of metal chosen from the group Au, Pt, Pd, Rh, Ag, and Ni into contact with the surface of the polymer layer and heating the polymer layer, thereby stabilizing the polymer layer and dispersing resulting metal ultrafine particles formed from the metal without aggregating them.

The invention further comprehends polymerizing or baking the surface treating agent printed on the base material surface. At least one kind of metal ultrafine particles chosen from the group Au, Pt, Pd, Rh, Ag, and Ni is independently dispersed in the layer to be plated.

The layer may be formed by polymerizing or baking the surface treating agent printed onto the base material surface and adhering a metal film thereon by plating, wherein at least one kind of metal ultrafine particle chosen from Au, Pt, Pd, Rh, Ag, and Ni is independently dispersed in the layer to be plated. Thus, the layer to be plated is interposed between the base material and the metal film and fixes these together.

The ultrafine particles are not completely enveloped by the fixative in the layer to be plated but are partially exposed. The metal particles become nuclei and precipitate metal ions and the metal plating film is strongly adhered thereto.

Viscosity adjusting material may be utilized to maintain the viscosity of the treating agent at a suitable level for improved screen printing.

DETAILED DESCRIPTION OF THE PREFERRED EMBODIMENT

Figure 1:
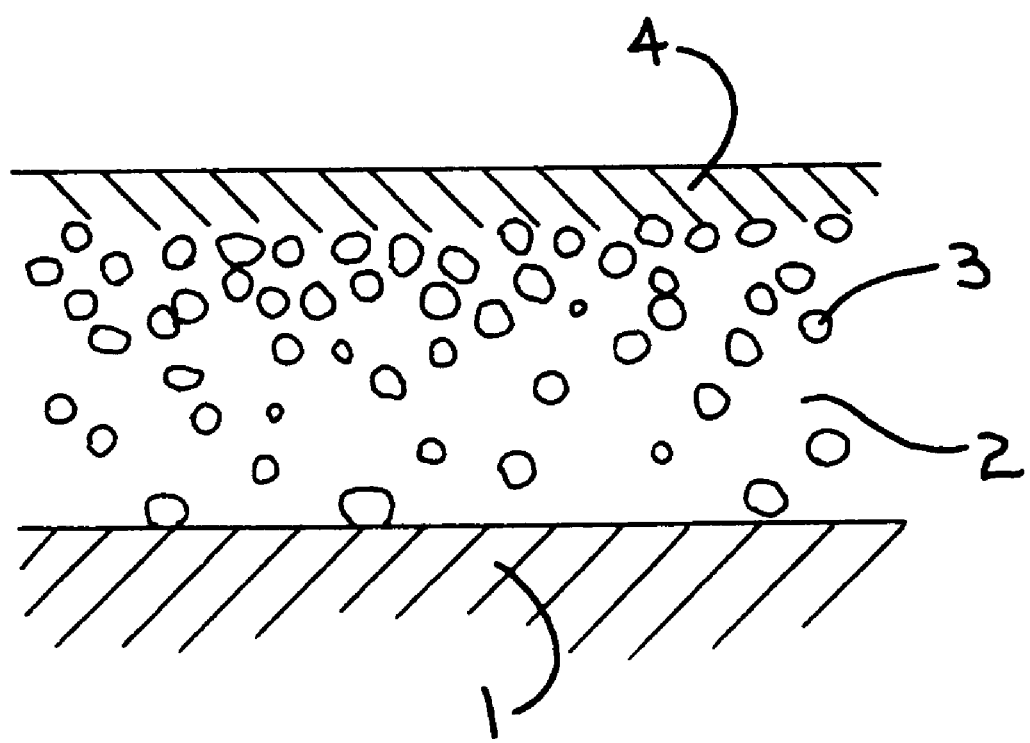
FIG. 1 shows a cross-sectional view of a plating-treated base material according to the invention.

According to the invention, the metal ultrafine particles used in the surface treating agent may be in the form of a complex made by dispersing metal ultrafine particles in a polymer in advance or in an organic solvent, or the like.

In forming such a complex, a polymer layer is formed in a thermodynamically inequilibrized state. A vacuum vapor deposition method can be used wherein a polymer is heated in a vacuum, melted, and vaporized. A polymer layer is solidified on a substrate.

Alternatively, the layer may be formed by a thermal decomposition method.

Further, a melting and rapid cooling and solidifying method may be employed wherein a polymer is heated at a temperature above its melting temperature and in this state immediately immersed in liquid nitrogen and thereby rapidly cooled, and a polymer layer thereby made to adhere to the substrate.

In the case of vacuum vapor deposition, using an ordinary vacuum vapor deposition apparatus, it is possible to obtain a high molecular weight layer on a substrate of glass or the like with a vacuum of $10^{-4}$ to $10^{-6}$ Torr and a vapor deposition rate of 0.1 to 100 $\mu$m/min, and more preferably 0.5 to 5 $\mu$m/min.

The thermal decomposition method is a method wherein a polymer, serving as the raw material, is thermally decomposed and vaporized in a closed space at a reduced pressure. This vapor is solidified whereby a regenerated polymer in a thermodynamically inequilibrized state (having a semi-stable structure) results. This is a method wherein after a predetermined amount of a polymer put in is thermally decomposed and vaporized this vapor is aggregated into a regenerated polymer in a heat treatment region. The vapor which did not aggregate is then aggregated into an oil-form low molecular weight material in a cooling region and a regenerated polymer in which oil-form low molecular weight polymer does not mix is obtained.

In the melting and rapid cooling and solidifying method, a polymer layer is obtained by melting a polymer and rapidly cooling it at a rate higher than the characteristic critical cooling rate of the polymer. A polymer layer obtained in this way is placed in a thermodynamically unstable inequilibrized state and with the passing of time shifts to an equilibrium state.

Polymers useful here are, for example, nylon 6, nylon 66, nylon 11, nylon 12, nylon 69, polyethylene terephthalate (PET), polyvinyl alcohol, polyphenylene sulfide (PPS), polystyrene (PS), polycarbonate, polymethyl methacrylate, and the like. A polymer having a molecular aggregation energy of 2000 cal/mol, as defined in the Japan Chemical Society Edition Chemical Handbook Applied Edition (published 1974) paragraph 890, or over, is preferable. Satisfactory polymers include those generally called crystalline polymers and noncrystalline polymers.

The thermodynamically inequilibrized polymer layer is caused to have a metal layer adhered to a surface thereof In this process, the metal layer is laminated onto the polymer layer by a method such as vapor deposition of a metal on the polymer layer using a vacuum vapor deposition apparatus, or by directly adhering a metal foil or metal sheet to the polymer layer. The metal may be Au (gold), Pt (platinum), Pd (palladiun), Rh (rhodium), Ag (silver), Ni (nickel), etc.

The complex of the metal layer and the polymer layer adhered together is heated at a temperature above the glass transition point and below the melting point of the polymer and the polymer layer is thereby shifted into a stable state. As a result, the metal of the metal layer forms metal ultrafine particles of a diameter under 100 nm and having most of its particle diameter distribution in the range of 1 to 10 nm. These particles diffuse and permeate into the polymer layer. This continues until the polymer layer completely relaxes, and the thickness of the metal layer adhered to the high polymer layer also decreases to zero. The ultrafine particles are dispersed within the high polymer layer without aggregating. In this case, the contained amount of the ultrafine particle is 0.01 to 80 wt %. This amount can be adjusted as desired by changing the production conditions of the polymer layer and changing the thickness of the metal layer.

The method described above is not the only method of manufacturing the complex. For example, there are methods such as making metal ultrafine particles by a gas phase method such as molten vaporization methods, a liquid phase method such as precipitation methods, a solid phase method, or a dispersion method and mechanically mixing ultrafine particles with a polymer consisting of a solution or a molten liquid, or simultaneously evaporating and mixing the polymer and a noble metal and mixing them in the gas phase.

The obtained complex is mixed with and dissolved in a solvent consisting of methacrezole, dimethylformamide, cyclohexane, formic acid, or the like, and made into a paste in which the ultrafine particles are uniformly dispersed. Because the diameter of the ultrafine particles is small and a mutual interaction with the polymer exists, separation from the polymer, precipitation, and aggregation of ultrafine particles do not occur.

Manufacture of ultrafine metal particles independently dispersed in an organic solvent is illustrated for example by an in-gas evaporation process disclosed in Japanese Unexamined Patent Publication No. H.3-34211. In this process, helium gas is introduced into a chamber. Evaporated metal is cooled and condensed by collision with the inert gas. In this process, immediately after formation of the particles in an isolated state, a vapor of an organic solvent such as a α-terpineol or toluene is introduced to cover the particle surfaces.

The fixative used in this invention is preferably an organic compound including a metal, such as for example Ba, Mg, Si, Al, Ca, Ti, V, Cr, Mn, Fe, Co, Ni, Cu, Zr, In, Sn, and Pb; or non-metal P. The objectives of the invention are achieved by using alkoxides such as ethoxides, propoxides of these metals, organic acid salts such as napthates, acetates and organic complex salts such as acetyl acetone complex, and oxine complex salt.

The fixative is made a metal oxide by baking the treating agent, or by a condensation polymerization reaction. The resulting polymer suppresses particle growth of the metal ultrafine particles and simultaneously acts as an adhesive, strongly adhering to the base material surface and the metal ultrafine particles.

Pre-plating treating liquid and non-electrolytic plating liquid may be Al, Ti, In, Sn, Si. For example, as specific examples, Al-acetyl acetone salt, ethyl aceto diisopropoxide Al acetate, Al-oxine complex salt, Si-propoxide, tetraetoxysilane, tetrapropoxytitanium, tetrabutoxytitanium, Ti-acetyl acetone salt, stearic acid Ti, In-acetyl acetone salt, In-isopropoxide, In oktylate, Sn-etoxide, Sn-isoaminoxide, Sn-acetyl acetone salt, and the like, can be used.

The blend amount is 0.1 to 10 mol, and more preferably 0.2 to 4 mol, with respect to 1 mol of the metal of the ultrafine particles. When it is less than 0.1 mol, the metal ultrafine particles aggregate and do not become catalytically active and are unable to adhere to the base material. When, on the other hand, the blend amount exceed 10 mol, the fixative envelops the particles and there ceases to be catalytically active. Then, due to crystallization of the fixative, the film formed on the surface of the base material easily breaks and peels off.

The film strengthener used in this invention is an organic compound including an element M', where M' is Si, B, P, A, or Sn. Such strengtheners include tetra i-propoxysilane, silicone oil, polysiloxane, triethoxysilane, tetraethoxysilane, tetra-n-butoxysilane, dietoxy dimethylsilane, triethyl borate, triphenyl borate, iproniadide phosphate, diphenyl phosphate, phosphono acetate, phosphoramidon, di-n-butyl phosphate, triethyl phosphate, n-amyl phosphate, etc. The preferred amount is 0.05 to 5 mol with respect to 1 mol of the metal of the ultrafine particles. When the amount of the film strengthener exceeds 5 mol, the plating depositability and growth characteristics become poor.

The organic solvent should be capable of dissolving the fixative without allowing the ultrafine particles in the treating agent to aggregate. When a complex made by independently dispersing ultrafine particles in a polymer in advance is used, methacrezole, methyl formamide, chlorophenol, dimethyl imidozolidinon, and dichloromethane are desirable. When the complex is made by independently dispersing the ultrafine particles in an organic solvent, xylene, benzene, toluene, diphenyl methane, and terpineol are desirable.

In a treating agent including metal ultrafine particles, fixative and organic solvent, the added amount of the metal ultrafine particles and the fixative, which are solid components, by concentration in the treating liquid, is 0.0001 to 50 wt. %, and preferably suitably determined according to the method of adhering the treating liquid to the base material.

The viscosity adjusting material used in this invention keeps the viscosity of the treating agent at a suitable level and keeps handling at the time of screen printing good. It is desirable that this viscosity adjusting material decompose at a low temperature during baking, but his is not necessary and any viscosity adjusting material soluble in the organic solvent may be used.

Examples of viscosity adjusting materials include cellulose types such as nitrocellulose, ethyl cellulose, cellulose acetate, butyl cellulose, acrylic types such as methyl acrylate, a polyamide types such as nylon 6, nylon 11, nylon 12, polyester types such as polyethylene terephthalate, polycaprolacton, polyether types such as polyoxymethylene, polycarbonate type, or polyvinyl types such as polystyrene, polybutadiene or polyisoprene.

The concentration of the viscosity adjusting material is determined by the purpose of use of the treating agent, but the concentration in the treating liquid should not be over 50 wt %. In a treating liquid including a viscosity adjusting material, the ultrafine particles and the fixative are blended 0.1 to 10 mol, and more preferably 0.2 to 4 mol of the fixative with respect to 1 mol of the metal of the ultrafine particles. The added amount of the metal ultrafine particles and the fixative is 0.0001 to 50 wt % by concentration in the treating liquid, and preferably decided according to the method of adhering the treating liquid to the base material used.

In the making of the above-discussed treating agent, the metal ultrafine particles are dispersed in an organic solvent. A viscosity adjusting material is added to and dissolved in the organic solvent in advance. Finally, the fixative is added and well stirred.

The treating agent is coated onto a base material of ceramic, glass, polymer, metal, or the like, by brush-coating, screen printing, dipping, spraying, knife-coating, etc.

Among these, with screen printing, under a horizontally disposed screen (for example, a polyester plain weave, 255 denier), a base material (glass) is disposed with a gap of several millimeters therebetween. After the treating agent is placed on this screen, the treating agent is spread over the entire surface of the screen using a scraper. At this time, there is a gap between the screen and the base material. Next, the screen is pushed on and moved with a squeegee so that the screen makes contact with the base material. With this, one printing is concluded and thereafter this is repeated.

After that, the base material is left for 10 to 30 minutes in an atmosphere of 100 to 200° C., the organic solvent is removed, and dried, or dried while being degassed in a sealed vessel, and shifted to a polymerizing or baking step.

In the polymerizing or baking step, in the case of a fixative (metal alkoxide) with which a condensation polymerization reaction is to be carried out, heat treatment is carried out in air in a temperature range of from room temperature to 300° C. The objects of the invention are also achieved by heating to a temperature of 300 to 800° C. and oxidizing-decomposing it to produce a metal oxide.

When using a fixative with which condensation polymerization is not to be carried out, it is oxidized-decomposed and made a metal oxide in air at temperature conditions of over 300° C.

The base material obtained by adhering and baking the treating agent has on its surface a layer to be plated in which the metal ultrafine particles are independently dispersed. The metal ultrafine particles are not completely enveloped but are partially exposed. This is acid-treated and washed with water. It is put into an electrolysis tank and non-electrolytic plating is carried out, with the exposed metal ultrafine particles as nuclei, metal ions are deposited and a metal film is made.

FIG. 1 shows a sectional view of a base material, or substrate 1. Metal ultrafine particles 3 are dispersed in a matrix layer 2 on the substrate. As shown, an increased proportion of the particles 3 is disposed at the surface of the matrix 2. A metal film 4 is made by depositing metal ions on the surface of this layer. Even when the base material 1 is glass or ceramic having a smooth surface, the treating agent of the invention assures a fine bond of the plating 4 thereto.

The plating may comprise non-electrolytic plating as desired.

SPECIFIC EMBODIMENTS

Inventive Embodiments 1 to 4 and Comparison Examples 1 to 4

The blend tables shown in Table 1 (Inventive Embodiments) and Table 2 (Comparison Examples) below, are dipping blends.

TABLE 1

|  | Inventive Embodiment | | | |
| --- | --- | --- | --- | --- |
|  | 1 | 2 | 3 | 4 |
| noble metal ultrafine particle manufacturing method | RAD method | RAD method | in-gas deposition | wet method |
| noble metal type | gold | gold | gold | gold |
| blend amount (wt %) | 0.01 | 0.01 | 0.01 | 0.01 |
| fixative | tetra propoxy titanium | tetra ethoxy silane | tetra propoxy titanium | tetra propoxy titanium |
| blend amount (wt %) | 0.0144 | 0.0101 | 0.0144 | 0.0144 |
| organic solvent | methylene chloride | methylene chloride | methylene chloride | methanol |
| blend amount (wt %) | 99.9356 | 99.9399 | 99.9656 | 99.9856 |
| gold/fixative (mol ratio) | 1/1 | 1/1 | 1/1 | 1/1 |

TABLE 2

|  | Comparison Example | | | |
| --- | --- | --- | --- | --- |
|  | 1 | 2 | 3 | 4 |
| noble metal ultrafine particle manufacturing method | RAD method | RAD method | wet method | — |
| noble metal type | gold | gold | gold | — |
| blend amount (wt %) | 0.01 | 0.01 | 0.01 | — |
| fixative | — | — | — | tetra propoxy titanium |
| blend amount (wt %) | 0 | 0 | 0 | 1.4272 |
| organic solvent | methylene chloride | methylene chloride | methanol | methanol |
| blend amount (wt %) | 99.9500 | 99.9800 | 99.9900 | 98.5728 |
| gold/fixative (mol ratio) | — | — | — | — |

According to these blend tables, noble metal ultrafine particles were added to predetermined amounts of organic solvent and stirred, and after that various fixatives were added and stirred and treating agents thereby made. The temperature during the process was room temperature.

The ultrafine particles of noble metal used in Inventive Embodiments 1 and 2 were obtained using a vacuum vapor deposition apparatus. This method is called the RAD method. That is, polymer pellets 5 g of nylon 11 were put into a tungsten board of a vacuum vapor deposition apparatus and reduced in pressure to $10^{-6}$ Torr. The tungsten board was heated in a vacuum and the polymer melted. On a base material (glass plate) disposed on the upper part of a mounting stand, in a vacuum of $10^{-4}$ to $10^{-6}$ Torr at a rate of about 1 μm/min a polymer layer of a vapor-deposited film of thickness about 5 μm was obtained. The molecular weight of this polymer layer was about ½ to ¹⁄₁₀ of the polymer pellets.

Gold chips were put into the tungsten board, heated, and melted. Vapor deposition was carried out in a vacuum of $10^{-4}$ to $10^{-6}$ Torr and a metal vapor-deposited film thereby formed on the polymer layer. This was taken out of the vacuum vapor deposition apparatus and left for 10 minutes in a constant temperature tank held at 120° C. and a complex obtained. As a result, gold was present at about 15 wt % in the polymer complex and the average particle diameter was 5 nm.

The polymer complex was mixed with methacrezole in the weight ratio 1:1 and a polymer complex solution thereby made, as shown in Table 1.

The metal ultrafine particles used in Inventive Embodiment 3 were made by the method called the in-gas vapor deposition method. The particles made in Inventive Embodiment 4 were made by a wet method by reducing an aqueous solution of a compound of gold (III), such as by adding calcium carbonate solution to chloroauric acid aqueous solution and reducing with formalin.

As Comparison Examples, one in which a fixative was not used and the metal ultrafine particles were treated independently, and one in which metal ultrafine particles were not used and treated with a fixative alone, were made.

As base materials, an alkali glass plate and an alumina sintered plate were used. After these base materials were immersed for several seconds in a treating liquid at room temperature, they were taken out, dried at room temperature, and then heat-treated for 10 minutes in air at the respective temperatures of 100° C., 300° C., 500° C., and 700° C. (alumina sintered plate only).

Metal layers were formed on the treated samples by non-electrolytic plating (immersion for 10 minutes in a Ni—B type non-electrolytic plating liquid, 90° C.) and vacuum vapor deposition (degree of vacuum $10^{-4}$ Torr, evaporation source tungsten wire, evaporated substance Ni, evaporation rate 5 nm/sec, evaporation amount 1.0 μm). The adherence of the nickel film to the base material was evaluated by a cellophane tape contact time peeling-off test.

Those results are shown in Table 3 (alkali glass plate) and Table 4 (alumina sintered plate).

TABLE 3

| Example metallizing film | Alkali Glass Plate | | | | | |
|---|---|---|---|---|---|---|
| | 100° C. | | 300° C. | | 500° C. | |
| | plated film | deposited film | plated film | deposited film | plated film | deposited film |
| Inventive Embodiment 1 | ×/– | 0/B | 0/B | 0/B | 0/B | 0/A |
| Inventive Embodiment 2 | ×/– | 0/B | 0/B | 0/B | 0/A | 0/A |
| Inventive Embodiment 3 | 0/B | 0/B | 0/B | 0/B | 0/A | 0/A |
| Inventive Embodiment 4 | 0/B | 0/B | 0/B | 0/B | 0/A | 0/A |
| Comparison Example 1 | ×/– | 0/C | ×/– | 0/C | Δ/– | 0/C |
| Comparison Example 2 | Δ/– | 0/C | Δ/– | 0/C | Δ/– | 0/C |
| Comparsion Example 3 | Δ/– | 0/C | Δ/– | 0/C | Δ/– | 0/C |
| Comparison Example 4 | ×/– | 0/C | ×/– | 0/C | ×/– | 0/C |

×: no plating film formed
Δ: no plating film growth
0: good plating film growth
A: good, no peeling
B: partial peeling
C: whole surface peeling

TABLE 4

| Example metallizing film | Alumina Sintered Plate | | | | | | | |
|---|---|---|---|---|---|---|---|---|
| | 100° C. | | 300° C. | | 500° C. | | 700° C. | |
| | plated film | deposited film | plated film | deposited film | plated film | deposited film | plated film | deposited film |
| Inventive Embodiment 1 | ×/– | 0/B | 0/B | 0/B | 0/A | 0/A | 0/A | 0/A |
| Inventive Embodiment 2 | ×/– | 0/B | 0/B | 0/B | 0/A | 0/A | 0/A | 0/A |
| Inventive Embodiment 3 | 0/B | 0/B | 0/B | 0/A | 0/A | 0/A | 0/A | 0/A |
| Inventive Embodiment 4 | 0/B | 0/B | 0/A | 0/A | 0/A | 0/A | 0/A | 0/A |
| Comparison Example 1 | ×/– | 0/C | ×/– | 0/C | ×/– | 0/C | ×/– | 0/C |
| Comparison Example 2 | Δ/– | 0/C | Δ/– | 0/C | Δ/– | 0/C | Δ/– | 0/C |
| Comparison Example 3 | Δ/– | 0/C | Δ/– | 0/C | Δ/– | 0/C | Δ/– | 0/C |
| Comparison Example 4 | ×/– | 0/C | ×/– | 0/C | ×/– | 0/C | ×/– | 0/C |

×: no plating film formed
Δ: no plating film growth
0: good plating film growth
A: good, no peeling
B: partial peeling
C: whole surface peeling These results show that in this embodiment the adherence of the metal layer and the base material is excellent and the metal ultrafine particles are strongly fixed to the base material by the fixative.

Inventive Embodiments 5 to 9 and Comparison Examples 5 to 6

The blend table shown in Table 5 shows blends for screen printing.

TABLE 5

|  | Inventive Embodiment | | | Comparison Example | | Inventive Embodiment | |
| --- | --- | --- | --- | --- | --- | --- | --- |
|  | 5 | 6 | 7 | 5 | 6 | 8 | 9 |
| noble metal ultrafine particle manufacturing method | RAD method | RAD method | RAD method | RAD method | RAD method | in-gas deposition | wet method |
| noble metal type | gold | gold | gold | gold | gold | gold | gold |
| blend amount (wt %) | 0.01 | 0.01 | 0.01 | 0.01 | 0.01 | 0.01 | 0.01 |
| fixative substance name | tetra propoxy titanium | tetra ethoxy silane | tetra propoxy titanium | tetra propoxy titanium | tetra propoxy titanium | tetra propoxy titanium | tetra propoxy titanium |
| blend amount (wt %) | 0.0036 | 0.0144 | 0.0577 | 0.2739 | 0.4272 | 0.0144 | 0.0144 |
| organic solvent | methacrezole | methacrezole | methacrezole | methacrezole | methacrezole | terpineol | methanol |
| blend amount (wt %) | 89.9517 | 89.9420 | 89.9030 | 89.7084 | 88.6704 | 89.9690 | 89.9910 |
| viscosity adjusting agent | nylon 11 | nylon 11 | nylon 11 | nylon 11 | nylon 11 | ethyl cellulose | ethyl cellulose |
| blend amount (wt %) | 9.9946 | 9.9935 | 9.9892 | 9.9676 | 9.8522 | 9.9965 | 9.9990 |
| gold/fixative (mol ratio) | 1/0.25 | 1/1 | 1/4 | 1/19 | 1/99 | 1/1 | 1/1 |

These blends were made by first adding a viscosity adjusting material to a predetermined amount of an organic solvent and stirring and dissolving it well. Metal ultrafine particles and a fixative were then added and stirred at room temperature. In Inventive Embodiments 5 to 7 the blend proportions of the metal ultrafine particles and the fixative were changed. In Embodiments 8 and 9, ultrafine particles of noble metals made by a different manufacturing method from Embodiments 5 to 7 were used to make the treating agent.

The base material was the same as in Inventive Embodiments 1 to 4.

Screen printing on the base material was carried out under a polyester plain weave, 200 denier screen disposed horizontally. The base material was disposed with a gap of several millimeters under the screen. The treating agent was placed on the screen, using a squeegee. The treating agent was spread over the entire surface of the screen. Next, the screen was pushed on and moved with a squeegee until the screen made contact with the base material surface.

The base material coated with treating agent was dried in air for 10 minutes at 150° C., and after that heat-treated for 30 minutes at the respective temperatures of 300° C., 500° C., and 700° C. (alumina sintered plate only).

The plating method and the evaluation of the adherence of the nickel film to the base material were the same as described above. Those results are shown in Table 6.

TABLE 6

|  | Alkali Glass Plate | | | | Alimina Sintered Plate | | | | | |
| --- | --- | --- | --- | --- | --- | --- | --- | --- | --- | --- |
| Example | 300° C. | | 500° C. | | 300° C. | | 500° C. | | 700° C. | |
| Metallizing film | plated film | deposited film | plated film | deposited film | plated film | deposited film | plated film | deposited film | plated film | deposited film |
| Inventive Embodiment 5 | 0/A | 0/A | 0/A | 0/A | 0/A | 0/A | 0/A | 0/A | 0/A | 0/A |
| Inventive Embodiment 6 | 0/B | 0/B | 0/A | 0/A | 0/B | 0/B | 0/B | 0/A | 0/A | 0/A |
| Inventive Embodiment 7 | 0/B | 0/B | 0/B | 0/B | 0/B | 0/B | 0/B | 0/B | 0/B | 0/B |
| Comparison Example 5 | x/– | x/– | x/– | x/– | 0/B | 0/B | 0/B | 0/B | 0/B | 0/B |
| Comparison Example 6 | x/– | 0/C | x/– | 0/C | x/– | 0/C | x/– | 0/B | x/– | 0/B |
| Inventive Embodiment 8 | 0/A | 0/A | 0/A | 0/A | 0/A | 0/A | 0/A | 0/A | 0/A | 0/A |
| Inventive Embodiment 9 | 0/A | 0/A | 0/A | 0/A | 0/A | 0/A | 0/A | 0/A | 0/A | 0/A | x: no plating film formed
Δ: no plating film growth
0: good plating film growth
A: good, no peeling
B: partial peeling
C: whole surface peeling As shown, when the fixative is 0.25 to 4 mol (Inventive Embodiments 5 to 7) with respect to 1 mol of the metal particles, the metal plating film is strongly adhered to the base material. When the amount of fixative becomes substantially larger, adherence becomes poor.

Inventive Embodiments 10 to 17

Table 7 shows other blends for screen printing. These blends were made by first adding a viscosity adjusting material to a predetermined amount of an organic solvent and stirring and dissolving it, then sequentially adding metal ultrafine particles, a fixative, and a film strengthener and stirring at room temperature. The base material used was non-alkali glass.

In the screen printing, under a horizontally disposed, polyester plain weave, 300 denier screen, the above-mentioned base material was disposed with a gap of several millimeters therebetween. After the treating agent was placed on this screen, a squeegee was used to spread the treating agent over the entire surface of the screen. Next, the screen was pushed on and moved with a squeegee until the screen made contact with the base material and the treating agent was coated onto the base material surface.

The coated base material was dried in air for 10 minutes at 120° C., and then heat-treated for 30 minutes at 500° C. The base material was then cleaned by dipping in a commercially available acidic cleaner liquid at room temperature for 1 to 5 minutes. After that, plating was carried out.

The sample was plated by being immersed in non-electrolytic plating solution (immersed for 20 minutes in Ni—B type non-electrolytic plating liquid at 65° C.).

The adherence of the nickel film and the base material was evaluated by fixing a lead wire to a nickel film on 2×2 mm on the base material by soldering and attaching a gauge to the lead wire and pulling it. The results are shown in Table 7.

TABLE 7

| | Embodiment | | | | | | | Embodiment | |
|---|---|---|---|---|---|---|---|---|---|
| | 10 | 11 | 12 | 13 | 14 | 15 | | 16 | 17 |
| gold fine particle (wt %) | 5.0 | 5.0 | 5.0 | 5.0 | 5.0 | 5.0 | gold fine particles (wt %) | 5.0 | 5.0 |
| fixative (wt %) (titanium acetyl acetone salt) | 13.8 | 32.1 | 11.0 | 19.7 | 20.8 | 13.4 | fixative (wt %) (titanium acetyl acetone salt) | 29.56 | 27.29 |
| film strengthener (wt %) (polycyclohexane) | — | — | 1.56 | 0.31 | 0.16 | 0.08 | film strengthener (wt %) (γ-ureido propyl triethoxysilane) | 1.12 1.12 | 2.23 2.23 |
| organic solvent (wt %) | 72.6 | 54.7 | 72.4 | 69.2 | 68.6 | 73.65 | organic solvent (wt %) | | |
| (terepineol) | | | | | | | (terepineol) (methanol) | 57.11 1.12 | 57.16 2.23 |
| viscosity adjuster (wt %) (ethyl cellulose) | 8.6 | 8.2 | 8.2 | 5.8 | 5.5 | 7.9 | viscosity adjuster (wt %) (ethyl cellulose) | 6.09 | 6.09 |
| gold/fixative/film strengthener (mole ratio) | 50/50/— | 30/70/— | 43/35/22 | 40/56/4 | 40/58/4 | 50/49/1 | gold/fixative/film strengthener (mole ratio) | 30/65/5 | 30/60/10 |
| plating depositability | 0 | 0 | × | Δ | 0 | 0 | plating depositability | 0 | 0 |
| electrical resistance of plating film (mΩ/∛) | 21 to 23 | 40 to 50 | 65 to 80 | 45 to 55 | 34 to 37 | 37 to 39 | electrcal resistance of film (mΩ/∛) | | |
| | | | | | | | aging condition 150° C. × 20 min. | 54–61 | 45–52 |
| | | | | | | | aging condition 300° C. × 20 min. | 36 | 36 |
| maximum contact strength of plating film (kg/2 mm. 2 mm) | 2.0 | 1.2 | 1.3 | 1.8 | 3.2 | 2.0 | maximum contact strength of plating film (kg/2 mm. 2 mm | | |
| | | | | | | | aging condition 150° C. × 20 min. | *3.5 more | *3.5 more |
| | | | | | | | aging condition 300° C. × 20 min. | *3.4 more | *4.0 more |
| metallic gloss of plating film | no | no | yes | yes | yes | yes | | | | plating depositability: 0: deposited within 1 min Δ: deposited in 1 to 5 mins ×: over 5 mins.
*The base material was broken
γ-ureido propyl triehoxysilane NH$_2$CONHC$_2$H$_6$Si(OC$_2$H$_5$)$_3$
titanium acetyl acetone salt Ti(OC$_4$H$_9$)$_2$(C$_5$H$_7$O$_2$)$_2$ As illustrated, adding the film strengthener caused the strength to increase, the smoothness to increase, and a gloss to appear on the film. When the concentration of the silicon in the film strengthener is high, the plating depositability and growth characteristics become poor.

The invention comprehends that at least one kind of metal ultrafine particle chosen from the group Au, Pt, Pd, Rh, Ag, and Ni, be dispersed in a specific amount of a fixative made up of an organic compound including a metal fixed to a base material substrate to effectively fix the ultrafine particles to the base material. An organic solvent, or film strengthener, may be added. When this mixture is coated onto a base formed of difficult to plate material, such as ceramic, glass, polymers, or metal, and polymerized or baked, the ultrafine particles are strongly held in the matrix in a state wherein they are partially exposed. The metal particles become nuclei for bonding of the plating thereto and, as a result, the metal plating film is strongly bonded to the base material.

By adding a film strengthener, the adhesion strength between the base material and the metal film may be further increased.

Adding a viscosity adjusting material maintains the viscosity of the treating agent at a suitable level to facilitate handling during screen printing.

The foregoing disclosure of specific embodiments is intended to be illustrative of the broad concepts comprehended by the invention.

What is claimed is:

1. A plated structure comprising:

a substrate having a surface;

a connecting layer having an inner bonding surface and an outer plating surface, said inner bonding surface being firmly bonded to said substrate surface, there being in said connecting layer a plurality of metal particles chosen from the group consisting of Au, Pt, Pd, Rh, Ag, and Ni, said metal particles having a diameter less than 100 nm and most of said metal particles in said plurality having diameters between 1 nm and 10 nm, and a metaloxide for preventing the aggregation of the metal particles, said metaloxide being formed of an organic compound including a metal and being present in the amount of 0.1 to 10 mol with respect to 1 mol of metal in the metal particles; and a metal film plated on said outer plating surface, wherein at least some of the plurality of metal particles at the outer plating surface are partially exposed thereby providing nuclei for the metal film.

2. The plated structure of claim 1, wherein said connecting layer further comprises a viscosity adjusting material formed of a high molecular weight material.

3. The plated structure of claim 1, wherein said metal oxide is a polymer for suppressing particle growth of the metal particles.

4. The plated structure of claim 1, wherein said metal oxide is a metal alkoxide.

5. The plated structure of claim 1, wherein said connecting layer comprises a layer polymerized on said substrate surface.

6. The plated structure of claim 1, wherein said connecting layer comprises a layer baked on said substrate surface.

7. A plated structure comprising:

a substrate having a surface;

a connecting layer having an inner bonding surface and an outer plating surface, said inner bonding surface being firmly bonded to said substrate surface, said connecting layer comprising a plurality of gold particles, said gold particles having a diameter less than 100 nm, and most of said gold particles in the plurality of gold particles having diameters in the range of 1 to 10 nm, the connecting layer also having a metal oxide present in an amount of 0.1 to 10 mol with respect to 1 mol of gold in the connecting layer; and a nickel film plated on said outer plating surface, wherein at least some of the plurality of gold particles at the outer plating surface are partially exposed thereby providing nuclei for the nickel film.

8. A plated structure comprising:

a substrate having a surface;

a connecting layer having an inner bonding surface and an outer plating surface, said layer inner bonding surface being firmly bonded to said substrate surface, there being in said connecting layer a dispersion of a plurality of individual separate metal particles selected from the group consisting of Au, Pt, Rh, Ag, and Ni, said metal particles having a diameter less than 100 nm, at least a portion of said metal particles are concentrated at said outer plating surface; and a metal film placed on said outer plating surface, said film being firmly secured through said connecting layer to said substrate surface, wherein at least some of the plurality of metal particles at the outer plating surface are partially exposed to provide nuclei for bonding of the metal film thereto.

* * * * *